(12) United States Patent
Yeh et al.

(10) Patent No.: US 10,670,331 B2
(45) Date of Patent: Jun. 2, 2020

(54) SECURING ASSEMBLY AND REFRIGERATOR EMPLOYING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jung-Chun Yeh, New Taipei (TW); Peng Deng, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 119 days.

(21) Appl. No.: 15/869,099

(22) Filed: Jan. 12, 2018

(65) Prior Publication Data
US 2019/0072321 A1   Mar. 7, 2019

(30) Foreign Application Priority Data

Sep. 5, 2017  (CN) .......................... 2017 1 0792360

(51) Int. Cl.
*F25D 29/00* (2006.01)
*F16M 1/00* (2006.01)
(Continued)

(52) U.S. Cl.
CPC ............ *F25D 29/005* (2013.01); *F16M 1/00* (2013.01); *F25D 23/02* (2013.01); *F25D 23/12* (2013.01)

(58) Field of Classification Search
CPC .. F25D 23/028; F25D 23/02; F25D 2323/024; F25D 2400/40; F25D 29/00; F25D 29/005; F25D 23/12; F16M 1/00
(Continued)

(56) References Cited

U.S. PATENT DOCUMENTS

| 7,090,141 B2 * | 8/2006 | Roh ........................ F25D 29/00 236/51 |
| 7,260,954 B2 * | 8/2007 | Jang ........................ F25D 23/12 312/405 |

(Continued)

FOREIGN PATENT DOCUMENTS

| CN | 202562205 U | 11/2012 |
| DE | 102013013113 | * 1/2015 |

(Continued)

OTHER PUBLICATIONS

CN 1782637 Jln et al; abstract and figure (Year: 2006).*
KR 2004069636 Lee abstract and figure (Year: 2004).*

*Primary Examiner* — Janet M Wilkens
(74) *Attorney, Agent, or Firm* — ScienBiziP, P.C.

(57) ABSTRACT

A securing assembly which can present and secure a tablet computer for example in a door of a refrigerator includes a receiving space for securing a display of the computer. At least one limiting opening and at least one slot are defined in one of the securing assembly or the display, the other one comprises at least one limiting post and at least one latch. The at least one limiting post is latched to the at least one limiting opening, the at least one latch is latched to the at least one slot, thereby securing the display to the securing assembly in a first direction. A refrigerator employing the securing assembly is also provided.

9 Claims, 6 Drawing Sheets

(51) Int. Cl.
F25D 23/02 (2006.01)
F25D 23/12 (2006.01)

(58) Field of Classification Search
USPC ........ 312/405, 405.1, 326–328, 265.5, 265.6
See application file for complete search history.

(56) References Cited

U.S. PATENT DOCUMENTS

| | | | |
|---|---|---|---|
| 2003/0103023 A1* | 6/2003 | Ootsuka | F25D 29/005 |
| | | | 345/87 |
| 2005/0097912 A1* | 5/2005 | Nam | F25D 29/005 |
| | | | 62/331 |
| 2015/0052920 A1* | 2/2015 | Park | F25D 29/005 |
| | | | 62/126 |
| 2019/0032994 A1* | 1/2019 | Choi | H05B 37/0281 |

FOREIGN PATENT DOCUMENTS

| EP | 1990698 | * 11/2008 |
|---|---|---|
| WO | 2018146831 | *  8/2018 |

\* cited by examiner

SECURING ASSEMBLY AND REFRIGERATOR EMPLOYING SAME

FIELD

The subject matter herein generally relates to a securing assembly and a refrigerator employing the securing assembly.

BACKGROUND

Many refrigerators include a tablet computer that serves as a controlling system. Normally, the tablet computer is mounted on a door of the refrigerator and at substantially same height as user's eyes. However, effectively mounting the tablet computer on the door can be problematic.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
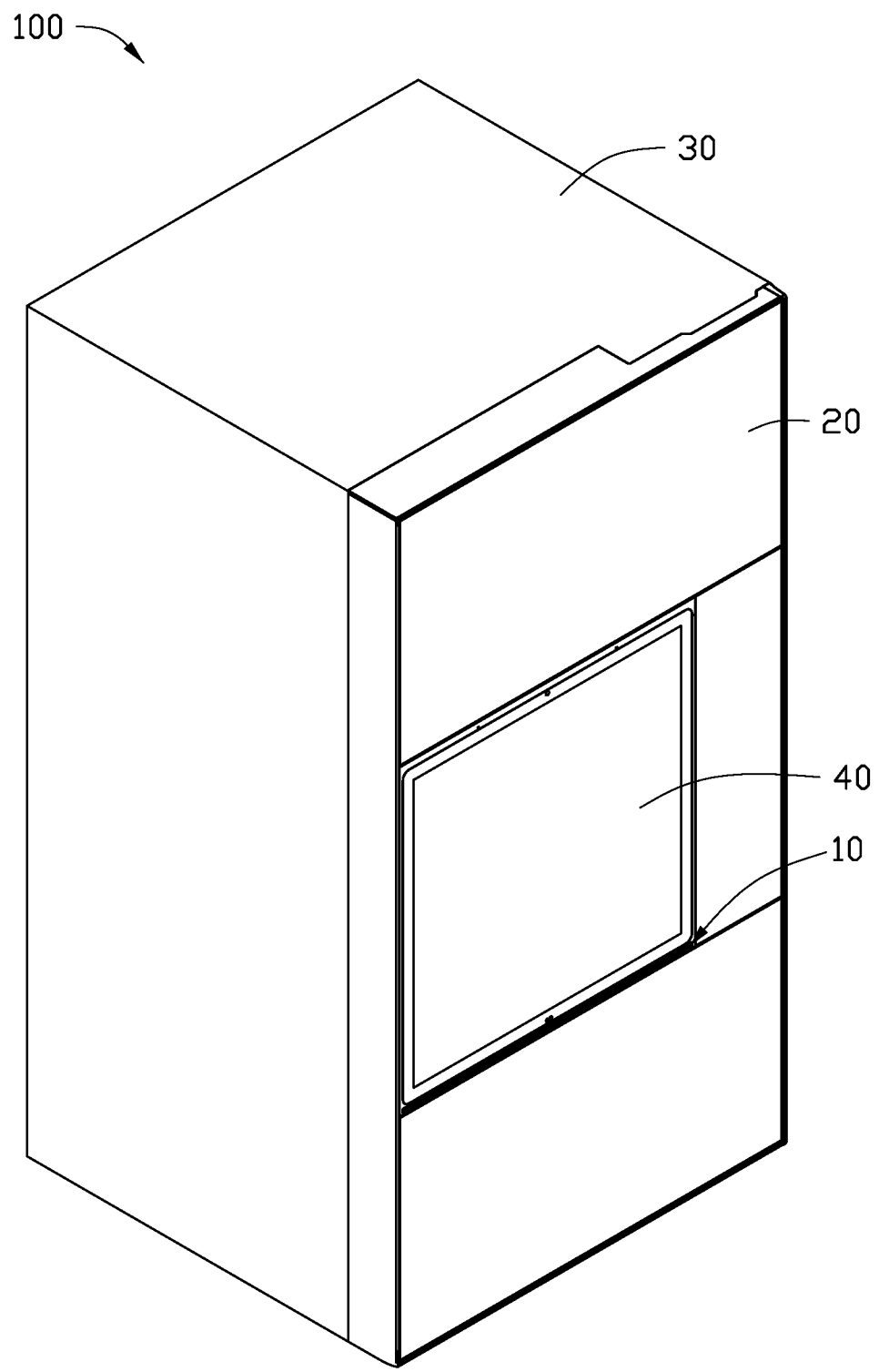
FIG. 1 is an isometric view of an exemplary embodiment of a refrigerator employing a securing assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a refrigerator 100. The refrigerator 100 includes a securing assembly 10, a door 20, a body 30, and a display 40. The body 20 is for storing goods. The door 20 is coupled to the body 30 and can be opened and closed to the body 30. The securing assembly 10 is coupled to an outside surface of the door 20 and for securing the display 40.

Figure 2:
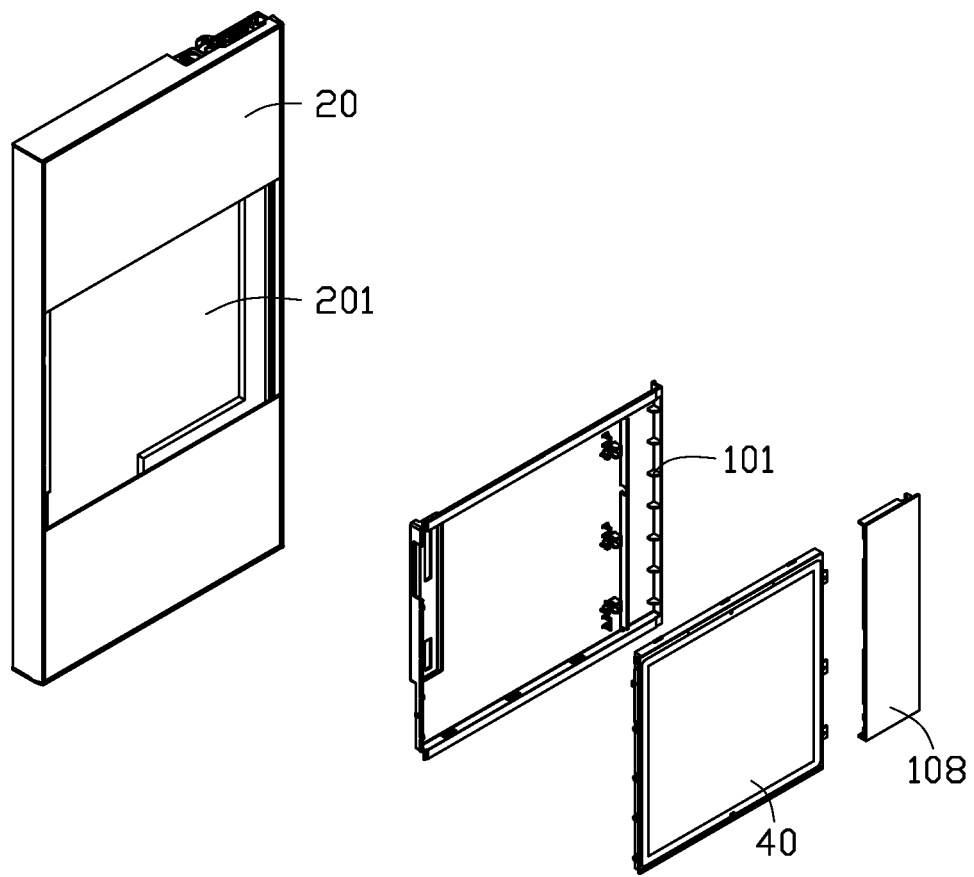
FIG. 2 is an exploded view of a door of the refrigerator of FIG. 1.

FIG. 2 illustrates that the door 20 defines a groove 201 on the outside surface for receiving the securing assembly 10.

The securing assembly 10 includes at least one base 101 for securing the display 40.

Figure 3:
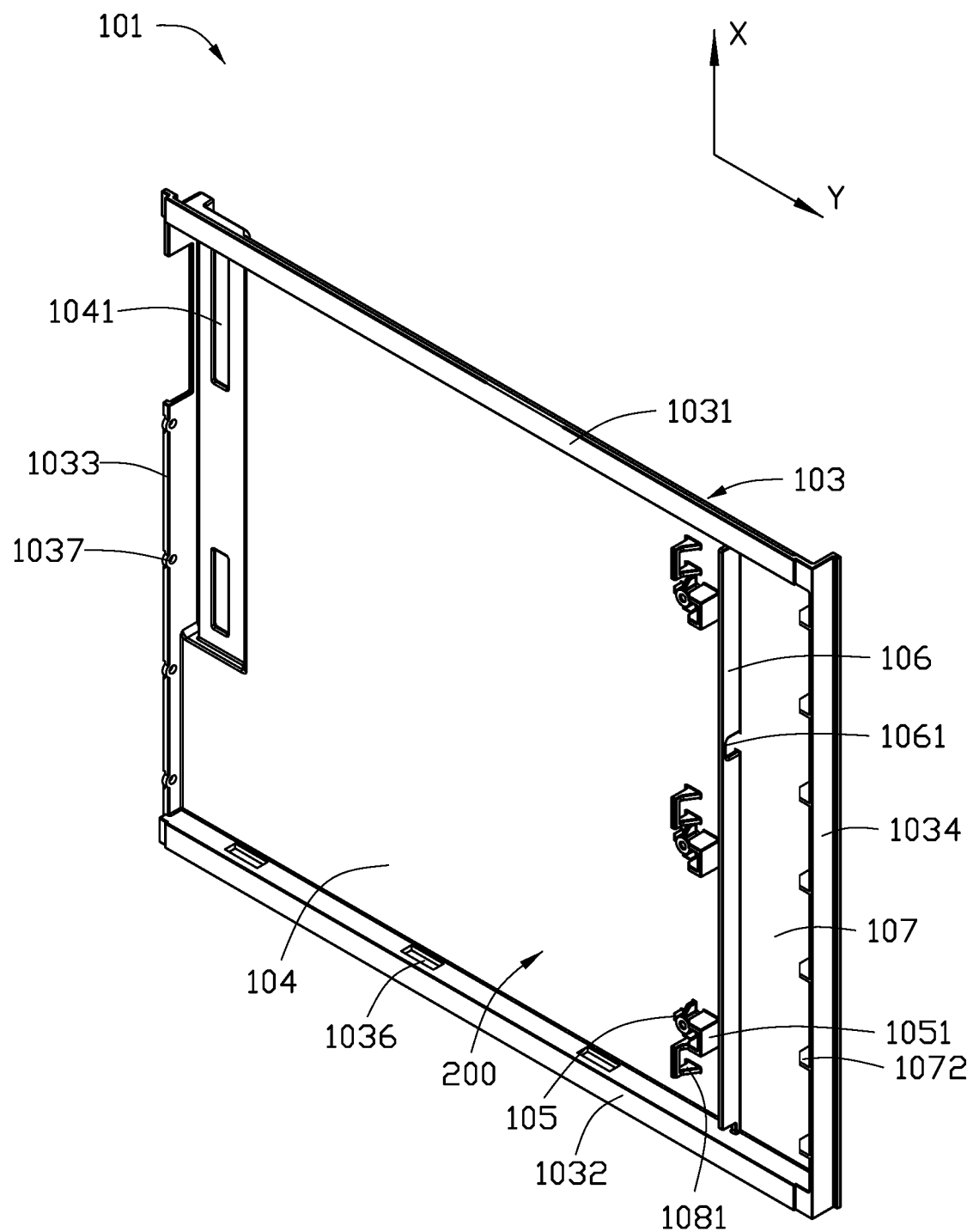
FIG. 3 is an isometric view of a base of the door of FIG. 2.

Referring to FIGS. 1, 2, and 3, the base 101 is received in the groove 201. The base 101 includes a peripheral wall 103 and a bottom wall 104. The bottom wall 104 is substantially rectangular. The peripheral wall 103 surrounds the bottom wall 104 to cooperatively form a receiving space 200. The receiving space 200 has a similar size and shape as the display 40, thus is suitable to receive the display 40. When the display 40 is received in the receiving space 200, the display 40 is aligned to the outside surface of the door 20, which may keep a preferred outside surface of the door 20 and refrigerator 100.

In at least one embodiment, the display 40 is adhered to the base 101 by glue.

Referring to FIGS. 1-4, the peripheral wall 103 includes an upper peripheral wall 1031, a lower peripheral wall 1032, a left peripheral wall 1033, and a right peripheral wall 1034. The upper peripheral wall 1031, the lower peripheral wall 1032, the left peripheral wall 1033, and the right peripheral wall 1034 surround the bottom wall 104 and cooperatively form the receiving space 200. The upper peripheral wall 1031 corresponds to the lower peripheral wall 1032, and the left peripheral wall 1033 corresponds to the right peripheral wall 1034. The peripheral wall 103 is corresponding to external wall of the display 40. The upper peripheral wall 1031 defines at least one slot 1035. In at least one embodiment, the slot 1035 is a rectangular recess slot. The lower peripheral wall 1032 defines at least one limiting opening 1036 therethrough. In at least one embodiment, the limiting opening 1036 is substantially rectangular.

Figure 5:
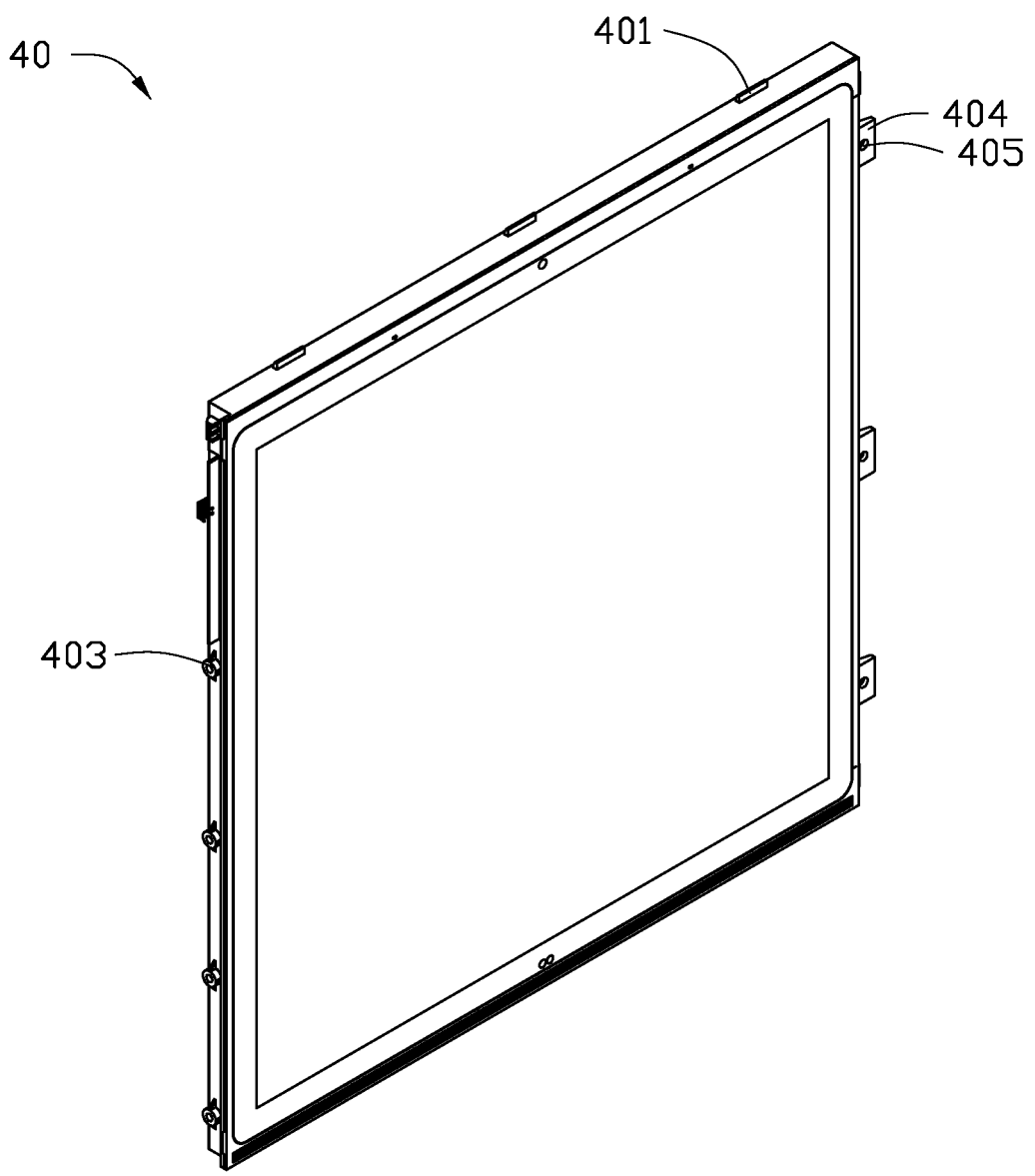
FIG. 5 is an isometric view of a display of the door of FIG. 2.
Figure 6:
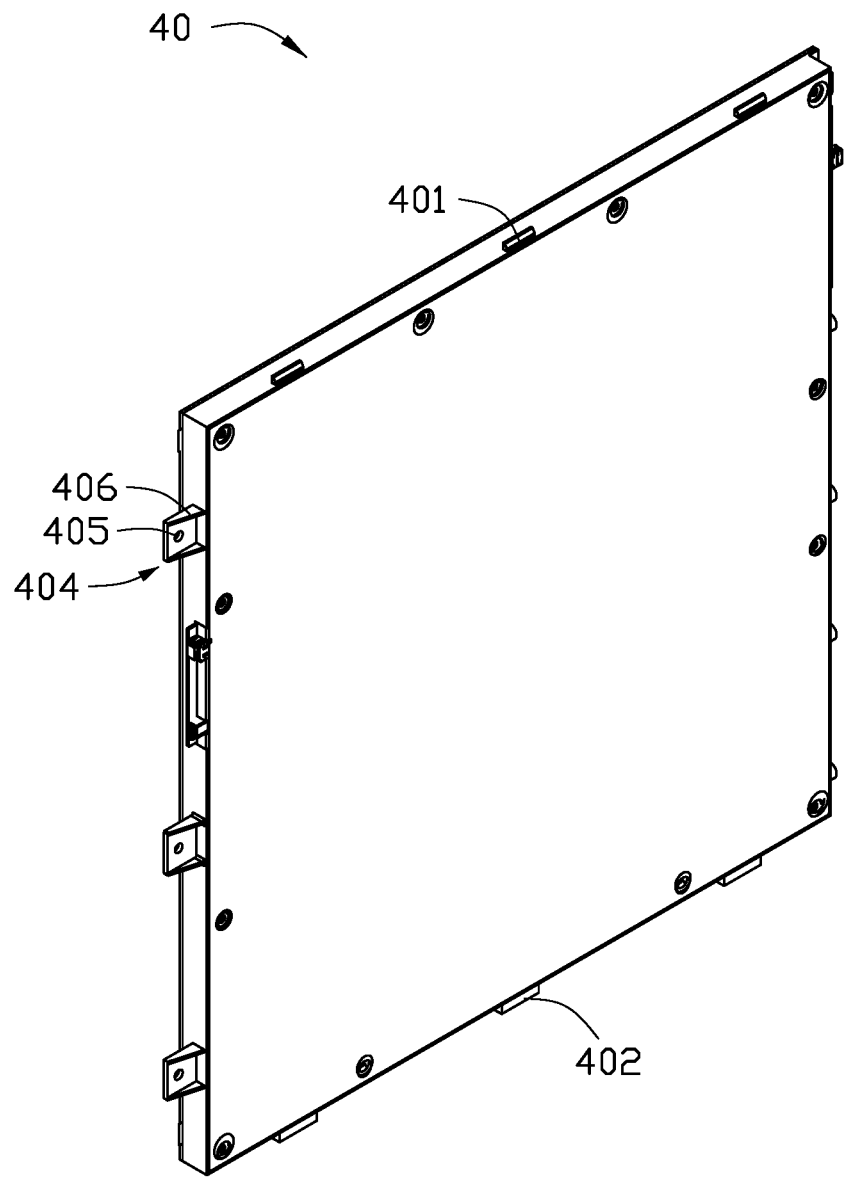
FIG. 6 is another isometric view of the display of FIG. 5.

Referring to FIGS. 5 and 6, the display 40 includes at least one latch 401 corresponding to the at least one slot 1035. The latch 401 is substantially a rectangular sheet with a hook on one end. The latch 401 is perpendicularly formed on a side of the display 40. The display 40 includes at least one limiting post 402 to be received in the at least one limiting opening 1036. The limiting post 402 is substantially a rectangular sheet and perpendicularly formed on another side of the display 40. Through latching the latch 401 into the slot 1035 and latching the limiting post 402 into the limiting opening 1036, the upper peripheral wall 1031 and the lower peripheral wall 1032 may secure the display 40 in a first direction, such as an X-axis direction.

In other embodiments, provided that the display 40 can be always secured to the base 101 in the first direction, the slot 1035 on the upper peripheral wall 1031 and the latch 401 on the display 40 can be exchanged and the limiting opening 1036 on the lower peripheral wall 1032 and the limiting post 402 on the display 40 can be exchanged.

In addition, for better securing the display 40 to the base 101 in a second direction, such as a Y-axis direction, the left peripheral wall 1033 and the right peripheral wall 1034 can be used to secure the display 40. In detail, the left peripheral wall 1033 defines at least one second mounting hole 1037 through the left peripheral wall 1033. The display 40 includes at least one second engaging post 403 which corresponds to the at least one second mounting hole 1037. A screw can be inserted through the second mounting hole 1037 to engage with the second engaging post 403, thus to secure the display 40 to the base 101.

The securing assembly 10 includes at least one first engaging post 105 formed on the bottom wall 104 and adjacent to the right peripheral wall 1034. In at least one embodiment, the first engaging post 105 can be a screw bolt. The display 40 includes at least one protruding piece 404 corresponding to the right peripheral wall 1034. The protruding piece 404 is substantially sheet-shaped. The protruding piece 404 defines a first mounting hole 405 corresponding to the first engaging post 105. A screw can be inserted through the first mounting hole 405 to engage with the first engaging post 105, thus to secure the display 40 to the base 101. Thus, through engaging a screw to the second mounting hole 1037 and the second engaging post 403 and engaging a screw to the first mounting hole 405 and the first engaging post 105, the left peripheral wall 1033 and the right peripheral wall 1034 may secure the display 40 in the second direction, such as a Y-axis direction.

The protruding piece 404 further includes an enforcing rib 406 for reinforcing a connection between the protruding piece 404 and the display 40.

In other embodiments, the display 40 further includes at least one first supporting piece 1051 adjacent to the first engaging post 105 to support weight of the display 40 on the first engaging post 105. A cross sectional surface of the first supporting piece 1051 is substantially U-shaped. The first supporting piece 1051 is perpendicular to the bottom wall 104. The first supporting piece 1051 supports the protruding piece 404 when the screw is inserted through the first mounting hole 405 to engage with the first engaging post 105.

The refrigerator 100 includes at least one camera set on an internal surface of the door 20. The display 40 is electrically connected to the camera by wire or wireless. The camera may capture images inside the refrigerator 100 and transmit same to the display 40. Therefore, the user may view the contents in the refrigerator 100 when the door 20 is closed.

Figure 4:
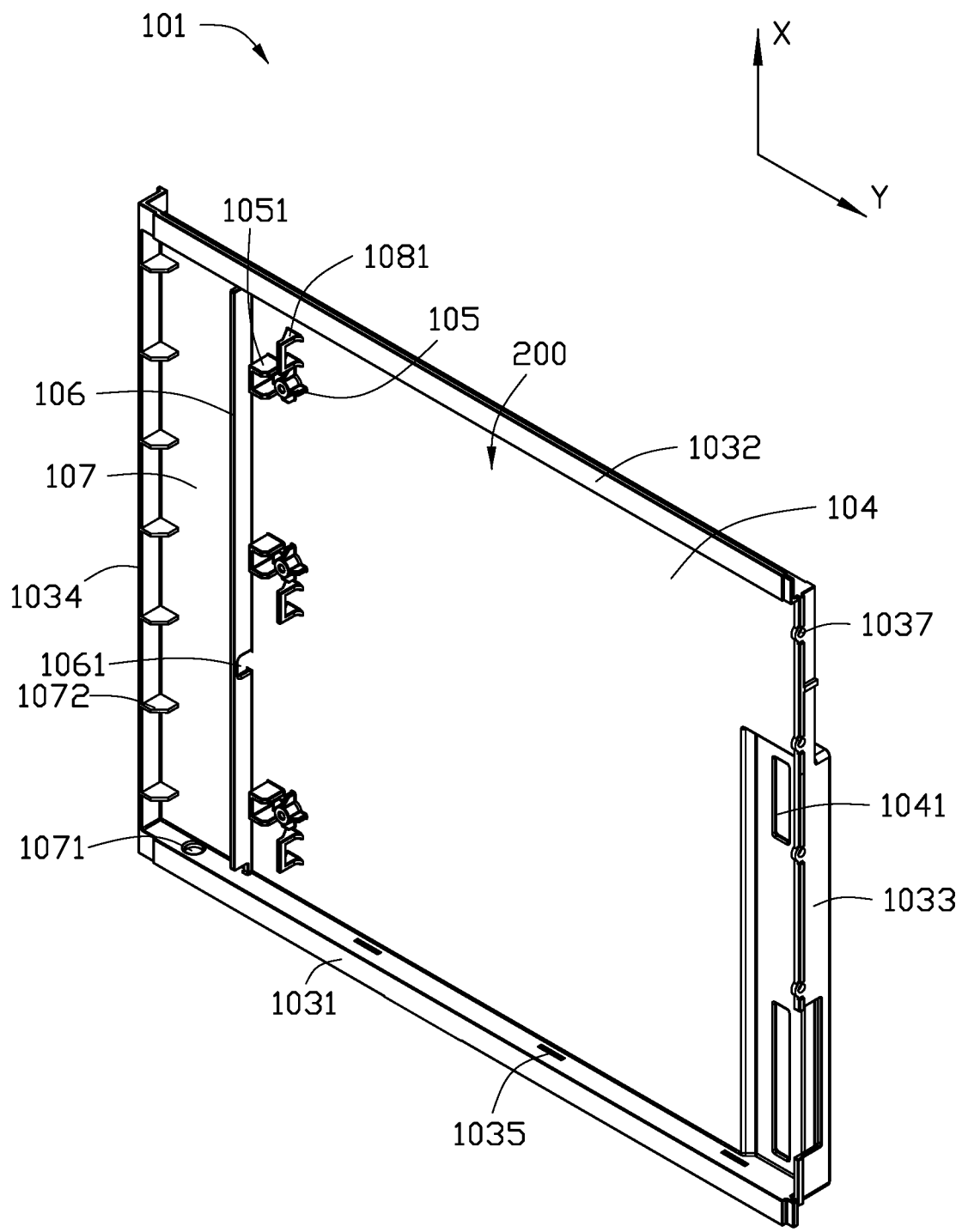
FIG. 4 is another isometric view of the base of FIG. 3.

Referring to FIGS. 3 and 4, the securing assembly 10 further includes a clapboard 106 arranged in the receiving space 200 for separating a storage space 107 from the receiving space 200. The storage space 107 is for receiving electronic elements, such as cables and wireless communication modules. The clapboard 106 is arranged between the left peripheral wall 1033 and the right peripheral wall 1034 in parallel. In other embodiment, according to a shape of the base 101, the clapboard 106 can also be arranged between the upper peripheral wall 1031 and the lower peripheral wall 1032 in parallel.

The clapboard 106 defines a first aperture 1061 throughout for passing cables, thus electrically connecting the display 40 and the electronic elements received in the storage space 107. The storage space 107 defines a second aperture 1071 through a side wall for passing cables, to electrically connect the electronic elements received in the storage space 107 and electronic elements of the door 20.

In addition, the bottom wall 104 defines a connecting opening 1041 for passing cables, thus electrically connecting the display 40 and the electronic elements of the door 20.

Referring to FIG. 2, the securing assembly 10 further includes a cover 108 for covering the storage space 107 and shielding the storage space 107. The cover 108 is aligned to the outside surface of the door 20. The bottom wall 104 includes at least one locker 1081 adjacent to the first engaging post 105. The cover 108 includes at least one locking piece (not shown) corresponding to the at least one locker 1081. The cover 108 is locked to the base 101 by locking the locking piece to the locker 1081.

In other embodiments, the cover 108 can be secured to the base 101 by other ways, such as bonding.

The storage space 107 includes a plurality of second supporting pieces 1072 on another side wall for supporting the cover 108. The second supporting pieces 1072 are substantially at a right angle.

In at least one embodiment, securing the display 40 to the securing assembly 10 can be done as follows. Firstly, before the door 20 is formed from foam, the base 101 of the securing assembly 10 is embedded in the groove 201 of the door 20.

Secondly, the limiting post 402 and the latch 401 of the display 40 are latched to the limiting opening 1036 and the slot 1035 of the base 101, respectively, to secure the display 40 to the base 101 in the first direction. Screws are inserted through the second mounting hole 1037 and the first mounting hole 405, and engage to the second engaging post 403 and the second engaging post 105 respectively, to secure the display 40 to the base 101 in the second direction.

Finally, the cover 108 is placed to cover and shield the storage space 107. Preferably, the cover 108 is aligned to the outside surface of the door 20. In least one embodiment, the cover 108 is latched to the base 101.

In general, the securing assembly 10 defines the slot 1035 and the limiting opening 1036 for latching the latch 401 and the limiting post 402 of the display 40, which effectively secure the display 40. In addition, the securing assembly 10 has a simple structure and can be easily assembled.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. A refrigerator comprising:
   a body;
   a door coupled to the body;
   a display of a tablet computer; and
   a securing assembly for being coupled to the door for securing the display, the securing assembly comprising:
      a receiving space for receiving the display;
   wherein one of the securing assembly or the display defines at least one limiting opening and at least one slot, the other one comprises at least one limiting post and at least one latch, the at least one limiting post is latched to the at least one limiting opening, the at least one latch is latched to the at least one slot, thereby securing the display to the securing assembly in a first direction; the refrigerator further comprises a base comprising a peripheral wall and a bottom wall, the peripheral wall surrounds the bottom wall to cooperatively form the receiving space; the refrigerator further comprises at least one first engaging post formed on the bottom wall and adjacent to the peripheral wall, the display includes at least one protruding piece, the protruding piece defines a first mounting hole corresponding to the first engaging post, the at least one first engaging post is engaged with the first mounting hole; the display further includes at least one first supporting piece adjacent to the first engaging post, the first supporting piece supports the protruding piece.

2. The refrigerator as claimed in claim 1, wherein the peripheral wall comprises an upper peripheral wall, a lower peripheral wall, a left peripheral wall, and a right peripheral wall, the upper peripheral wall is corresponding to the lower peripheral wall, the left peripheral wall is corresponding to the right peripheral wall, the at least one slot is defined on the upper peripheral wall, the at least one limiting opening is defined on the lower peripheral wall.

3. The refrigerator as claimed in claim 2, wherein the left peripheral wall defines at least one second mounting hole, the display includes at least one second engaging post correspondingly to the at least one second mounting hole, the at least one second engaging post is engaged with the at least one second mounting hole, thus to secure the display to the securing assembly in a second direction.

4. The refrigerator as claimed in claim 2, further comprising a clapboard, wherein the clapboard is arranged in the receiving space separating a storage space from the receiving space.

5. The refrigerator as claimed in claim 4, wherein the clapboard is arranged between the left peripheral wall and the right peripheral wall in parallel.

6. The refrigerator as claimed in claim 4, wherein the clapboard defines a first aperture throughout for communicating the receiving space and the storage space; the storage space defines a second aperture through a side wall, thus to electrically connect the electronic elements received in the storage space and electronic elements of the door; the bottom wall of the base defines a connecting opening, thus to electrically connect the display and the electronic elements of the door.

7. The refrigerator as claimed in claim 4, wherein the storage space includes a plurality of second supporting pieces on another side wall for supporting a cover.

8. The refrigerator as claimed in claim 1, wherein the protruding piece includes an enforcing rib for reinforcing a connection between the protruding piece and the display.

9. The refrigerator as claimed in claim 1, wherein the door defines a groove for receiving the securing assembly.

* * * * *